United States Patent
Ferguson

(10) Patent No.: US 6,711,678 B2
(45) Date of Patent: Mar. 23, 2004

(54) PRE-AUTHENTICATED COMMUNICATION WITHIN A SECURE COMPUTER NETWORK

(75) Inventor: Derek M. Ferguson, Palos Park, IL (US)

(73) Assignee: Expand Beyond Corporation, Chicago, IL (US)

( * ) Notice: Subject to any disclaimer, the term of this patent is extended or adjusted under 35 U.S.C. 154(b) by 0 days.

(21) Appl. No.: 10/117,287

(22) Filed: Apr. 5, 2002

(65) Prior Publication Data

US 2003/0191935 A1 Oct. 9, 2003

(51) Int. Cl.$^7$ ................................................. H06F 1/24
(52) U.S. Cl. ...................... 713/153; 713/155; 713/156; 713/168
(58) Field of Search ................................ 713/153, 155, 713/156, 168

(56) References Cited

U.S. PATENT DOCUMENTS 6,081,601 A     6/2000   Raivisto
6,253,326 B1    6/2001   Lincke et al.

OTHER PUBLICATIONS

Copy of International Search Report for International Patent Application No. PCT/US03/10659.

Primary Examiner—Thomas R. Peeso
Assistant Examiner—Grigory Gurshman
(74) Attorney, Agent, or Firm—Gardner Carton & Douglas LLP

(57) ABSTRACT

A method for securing communications within a computer network that includes wireless devices is presented. The method involves the use of a middleware server, which allows ill-performing and potentially insecure communications protocols to be off-loaded onto a more powerful machine running in a more secure environment, e.g., within a company's Intranet. The method can be practiced with any symmetric encryption algorithm, and can be combined with additional security methods, such as asymmetric encryption methods.

11 Claims, 7 Drawing Sheets

PRE-AUTHENTICATED COMMUNICATION WITHIN A SECURE COMPUTER NETWORK

FIELD OF THE INVENTION

The invention generally relates to the field of secure network communications. The invention relates more specifically to a method for pre-authenticating communications between a client and a middleware server in a network.

BACKGROUND OF THE INVENTION

Recently, technology has been developed that allows for wireless devices, such as personal digital assistants (PDAs), cell phones, and two-way pagers, to access computer networks; computer networks are no longer physically limited to a hard-wired environment. In the past, database or systems administrators for a computer network have been forced to work within the physical confines of a secure office computer network at a company or other organization. Access to a computer network through a wireless device allows the administrator to monitor and manage the computers within the network remotely. If the administrator does not happen to be physically near in the event of a crisis, then wireless access translates directly into a quicker response to problems and less downtime. This is extremely valuable to companies, such as banks, auction houses, brokerage firms, etc., which must keep their systems running uninterrupted in order to prevent a loss of revenue.

Thus, wireless devices provide an excellent solution to many old problems in systems and database administration, but they also introduce a new problem: how can communications within a network that includes wireless devices be kept secure? For a system or database to be administrated or managed remotely, communications within the network must be kept secure at all times and in all places to avoid a leak of confidential information. The difficulties of keeping a computer network secure are increased dramatically when wireless communications are allowed between computers within the network.

In the present state of the art in wireless communications, information is transmitted to and from a wireless device by electromagnetic radiation that will inevitably travel through public spaces. It is not desirable, and in some cases it may be a violation of law, for a company to allow public access to the information kept in its computer network. In addition, data must be transferred between a server inside, and a server outside a company's Intranet before it can be broadcast to a wireless device. Each connection must be secure to prevent unauthorized access to a secure computer network. Since private or confidential information may be kept in a computer within a secure computer network, it is extremely important that all communications within a network are secure.

Wireless devices present additional challenges to securing a computer network since they usually have fewer computing resources (e.g., processing power, memory, and bandwidth) available than do non-portable or handheld devices. Previous methods for securing a computer network have relied on algorithms that require a very fast processor or a long time to complete. Other methods have relied on a large amount of memory. The security methods used with non-wireless devices are not useful for securing a wireless device.

Currently, one of the most widely used methods for securing a computer network is with public key (also called "asymmetric") encryption. The use of public key encryption, in which a secret key is securely exchanged between a client and a server using a public key, is so prevalent that most current versions of Web browsers, such as NETSCAPE NAVIGATOR or MICROSOFT INTERNET EXPLORER, come preinstalled with "Certificates" for the most often visited "Certificate Authorities" on the Web.

Public key encryption is not well adapted for use within a computer network that includes wireless devices. Public key encryption is slow and difficult to implement in hardware. Public key encryption algorithms may run 10,000 times slower than a comparable private key (or "symmetric") encryption algorithm. Even in the future, when wireless devices are built with the computational resources today available only for desktop computers, public key encryption methods would be undesirable. In part because of their wide use there are many known ways for circumventing public key encryption.

One serious vulnerability in the public key encryption method exists in a step of requesting and transferring a private key from an internal server to a client within a network. This vulnerability can be exploited by "hijacking" a private key request from the client to the internal server. The request is hijacked by an "impostor" server, a server that acts in place of the internal server intended for communication with the client. The impostor server sends its own private key back to the client, and subsequent communication between the client and the impostor server is carried out with that private key—the client has no way of knowing that the impostor server is not the internal server it had intended for communication, and all information transferred to the impostor server is available for inspection by the impostor server's owner, usually a competing or hostile company that has specifically targeted the client will engage in this kind of attack. Use of a public key encryption method, in this case, would make all of the confidential information transferred within the computer network directly available to that competitor.

BRIEF SUMMARY OF THE INVENTION

The present invention is a method for secure network communication between a client and an internal server. The method involves the use of a middleware server, which allows ill-performing and potentially insecure communications protocols to be off-loaded onto a more powerful machine running in a more secure environment, e.g., within a company's Intranet. There are three basic steps in the method: (1) using a middleware server for processing public key encrypted messages sent between the client and the internal server; (2) using the client and the internal server for processing private key encrypted messages sent between the client and the internal server; and (3) using the middleware server, relaying private key encrypted messages sent between the client and the internal server. The security of the method can be further improved in by adding the step of pre-authenticating the client with a server key by securely copying the server key from the middleware server to the client.

No particular private key encryption is necessary for the method of the present invention, and in different embodiments of the invention different private key (or symmetric) encryption algorithms may be used. Accordingly, an additional step of using algorithm identification information to specify a private key encryption algorithm used for processing private key encrypted messages sent between the client and the internal server may be implemented.

Connections requested by a client may not always be established. In an embodiment, the present invention also provides an optional step of using the middleware server to notify the client when a connection between the client and the internal server is not completed.

In an embodiment, a method for secure network communication between a client and an internal server using a middleware server, might be implemented with a set of steps that may include, but is not limited to the following set of steps. The steps do not necessarily have to be executed in the order specified below, and could be executed in a different order.

The method begins by using the middleware server to generate a server key. The server key is then stored in memory on the middleware server. The memory used for storing the server key might be a hard disk, floppy disk, read only memory (ROM), random access memory (RAM), or some other form of memory designed to store digital information. The client is then pre-authenticated by securely copying the server key from the middleware server to the client, and by storing the server key in memory on the client. Subsequent communications between the client and the middleware server are carried out using the server key to encrypt and decrypt the communications.

The second set of steps includes using the client to generate location information for identifying the location of the internal server. After generation of the location information, which might be an Internet Protocol (IP) address or host name, the client continues by encrypting the location information using the server key stored in memory on the client to produce server key encrypted location information. The server key encrypted location information is sent from the client to the middleware server. The middleware server decrypts the server key encrypted location information using the server key stored in memory on the middleware server to produce the (original) location information generated by the client.

A significant advantage to the present invention is achieved in the next step, in which the middleware server is used to perform the public key encryption (or "handshaking") necessary for secure communication with the internal server. The processing of public key messages sent between the middleware server and the internal server in this step saves the computing resources of the client from being spent on such public key encryption.

After performing public key encryption, the middleware server requests a connection with the internal server specified by the location information. The internal server generates a session key, and continues the method by sending the session key to the middleware server. Having received the session key, the middleware server proceeds by encrypting the session key using the server key stored in memory on the middleware server to produce a server key encrypted session key, which is sent from the middleware server to the client.

Upon receipt of the server key encrypted session key, the client takes the step of decrypting the server key encrypted session key using the server key stored in memory on the client to produce the (original) session key. The client then continues by creating connection information for a connection between the client and the internal server. Using the session key, the client then encrypts the connection information in order to produce session key encrypted connection information, and sends the session key encrypted connection information to the middleware server.

The middleware server receives the session key encrypted connection information, and proceeds by relaying session key encrypted connection information to the internal server. The internal server decrypts the session key encrypted connection information using the session key that it generated, and may then proceed by completing a connection between the client and the internal server with the connection information. Once the connection has been completed, the middleware server may be used to patch the connection through to the client from the internal server.

The security of the method may be further improved by forcing the client to connect to the middleware server on a predetermined port, which might not be a "well-known" port, as would be used for typical non-secured network communication.

In another embodiment of the present invention, the private key (or symmetric) encryption algorithm used to produce the session key (and to encrypt and decrypt communications between the client and the internal server) is specified by using the internal server to generate an algorithm identification. The algorithm identification might be in any data format that would allow for a particular encryption algorithm within a finite set of such algorithms to be identified uniquely. In an embodiment, the set of symmetric encryption algorithms might include DES, DESX, AES, 3DES, Blowfish, or IDEA. Other symmetric encryption algorithms might be chosen to be included with the set based on the kinds of computing resources available and on other factors, as is known to one of ordinary skill in the art.

After selecting an algorithm, and producing an algorithm identification, the method proceeds with the step of sending the algorithm identification from the internal server to the middleware server. Before sending the algorithm identification to client, the middleware server encrypts the algorithm identification using the server key stored in memory on the middleware server to produce server key encrypted algorithm identification. Upon receipt at the client, the server key encrypted algorithm identification is decrypted, producing the (original) algorithm identification. The encryption algorithm that is to be used with the session key is identified with the algorithm identification. When more than one encryption algorithm is used and identified according to this method, the difficulty of cracking an encrypted messages increases greatly: when the messages are encrypted using different algorithms, the message contents may not be "guessed" as easily by comparison (i.e., the messages are not as susceptible to cryptanalysis because both the algorithm and the key space varies).

In order to further secure the computer network using the method of the present invention, an optional set of steps including a "pinging" or periodic polling may be implemented. The pinging may be performed in either direction within the network, i.e., in the present invention, a ping might be sent from the client to the middleware server, from the middleware server to the client, from the middleware server to the internal server, or from the internal server to the middleware server. Connections that remain idle for longer than a predetermined length of time might be dropped. This feature makes certain cryptanalytic attacks on the computer network more difficult, since some attacks may require passive listening on the client side in order to gain unauthorized access to the network.

In an embodiment of the present invention, the public key encryption is carried out using the Secure Sockets Shell (SSH). SSH establishes a single TCP/IP connection from the client to the server. The communications through the connection are encrypted (using an asymmetric encryption algorithm). Both the client and the server identity may be authenticated (or pre-authenticated as in the present invention) using SSH. The communications may also be compressed. In other embodiments of the present invention, a different protocol, such as SSL or TSL might be used for these steps of the method, and, as would be recognized by one of ordinary skill in the art, it is not necessary to the present invention that SSH be used with these steps in the method.

Another embodiment of the present invention relies on the 3DES encryption algorithm as its symmetric encryption algorithm, using 3DES to generate the session key (although the algorithm may also be varied, as described above). The 3DES algorithm is a modification of the older Data Encryption Standard (DES) algorithm. The DES has a key length of 56 bits, which is often expressed as a 64-bit number, with the extra eighth bits being used for parity. From the key, 16 subkeys are derived, which are used in 16 separate rounds of the algorithm. The 3DES encryption algorithm is substantially similar to the DES algorithm, but is applied in three separate rounds, with a new 56-bit key in each round. The 3DES encryption algorithm is thought to be unbreakable (i.e., not vulnerable to cryptanalysis) for the foreseeable future, even taking into account future advances in computing resources.

In order to implement the method of the present invention within a computer network that includes wireless devices, it may be necessary to perform some additional manipulations to the data transferred between wireless devices and other computers within the network. In particular, communications to and from a wireless device may be short because of bandwidth considerations, even as short as a single key stroke. According to an embodiment of the present invention, short communications are "padded" with zeros before encryption and the padding of zeros is removed after decryption. This additional step may be necessary for the method of the present invention to be used with certain encryption algorithms that require a minimum block size.

An important advantage of the present invention is that it is not limited to use with a computer network that includes wireless devices. The present invention is well adapted for use in securing a computer network that includes wireless devices because it lessens the burden on the computing resources of a client, but it is not necessary to the present invention that the client be a wireless device. The client could be any computer within a computer network. In particular, the client might be a computer that has fewer computing resources than other computers within the computer network, but is not a wireless device. As would be recognized by one of ordinary skill in the art, there is nothing about the method of the present invention that requires the use of a wireless device within the computer network, and the present invention might be implemented for use within a network that includes other types of clients with limited computing resources, such as a computer network of Internet appliances or game consoles.

BRIEF DESCRIPTION OF THE DRAWINGS

The foregoing and other objects, advantages, and features of the present invention will be apparent from the following detailed description and the accompanying drawings, in which.

DETAILED DESCRIPTION OF THE INVENTION

Figure 1:
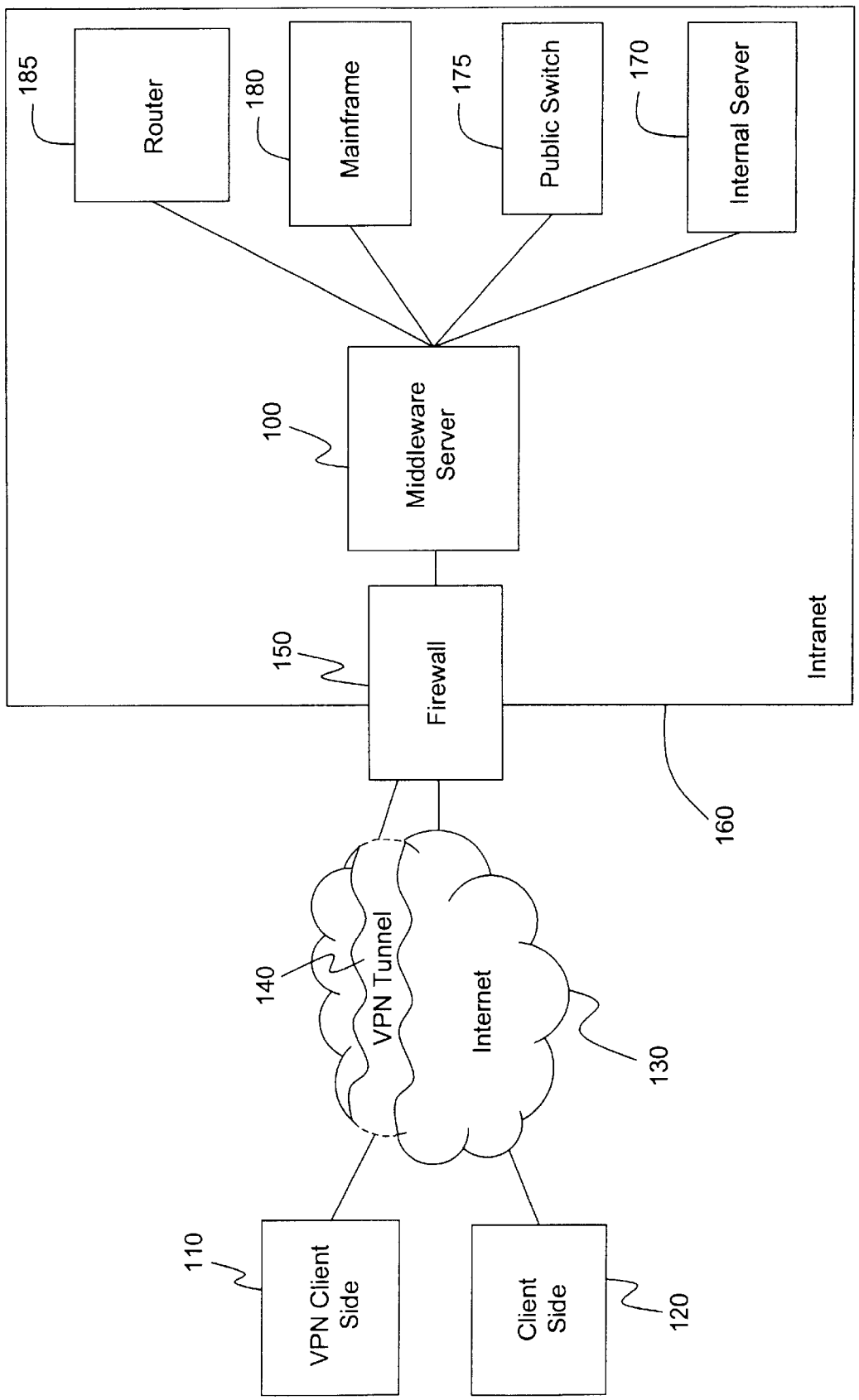
FIG. 1 is a block diagram of the overall structure of a secure computer network in accordance with an embodiment of the present invention.

While the present invention is susceptible to various modifications and alternative forms, certain preferred embodiments are shown by way of example in the drawings and will be described in detail herein. It should be understood, however, that the description is not intended to limit the invention to the particular forms described; on the contrary, the description is intended to cover all modifications, alternatives, and equivalents falling within the spirit and scope of the invention defined by the appended claims.

It is relatively simple for a company to maintain a secure network (or "Intranet") within its office if that network does not connect to any computers outside the office. In particular, most computer network security problems would be eliminated if the Intranet of a company did not connect to the Internet, or to other outside, non-secure network. Nevertheless, most businesses consider a connection to the Internet to be indispensable because of the efficiencies created in communication with customers and clients through electronic mail and the World Wide Web. Even greater efficiencies are available when network connections are extended to wireless devices, although wireless devices present a special challenge because of the limited computing resources that are available on most wireless devices. In the present invention, the middleware server, which is located within the secured company Intranet, is used to perform the most resource intensive operations of the method, effectively freeing up the computing resources of the clients to perform other functions, such as systems or database administration.

Figure 2:
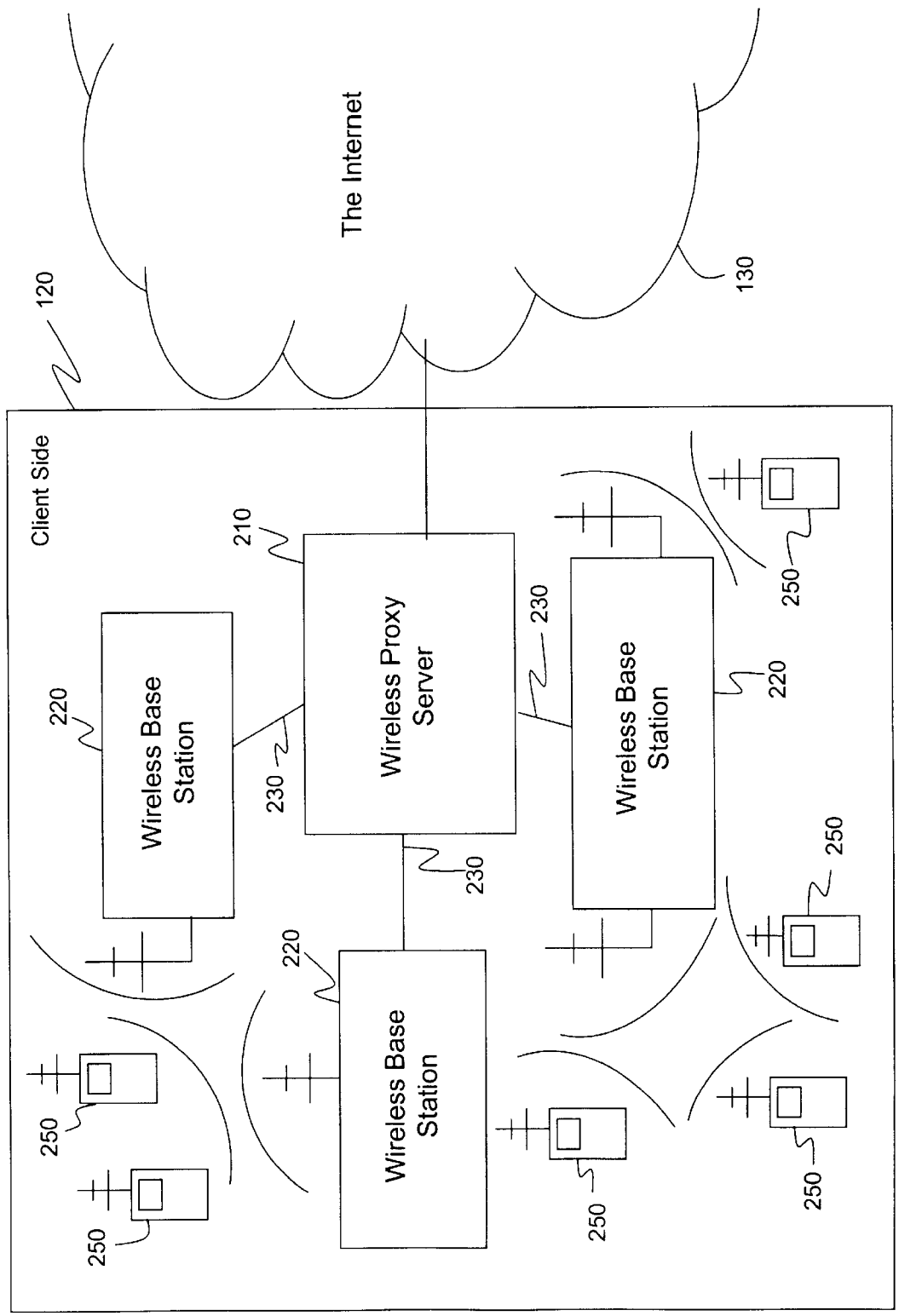
FIG. 2 is a block diagram of a client side within a secure computer network in accordance with an embodiment of the present invention.
Figure 3:
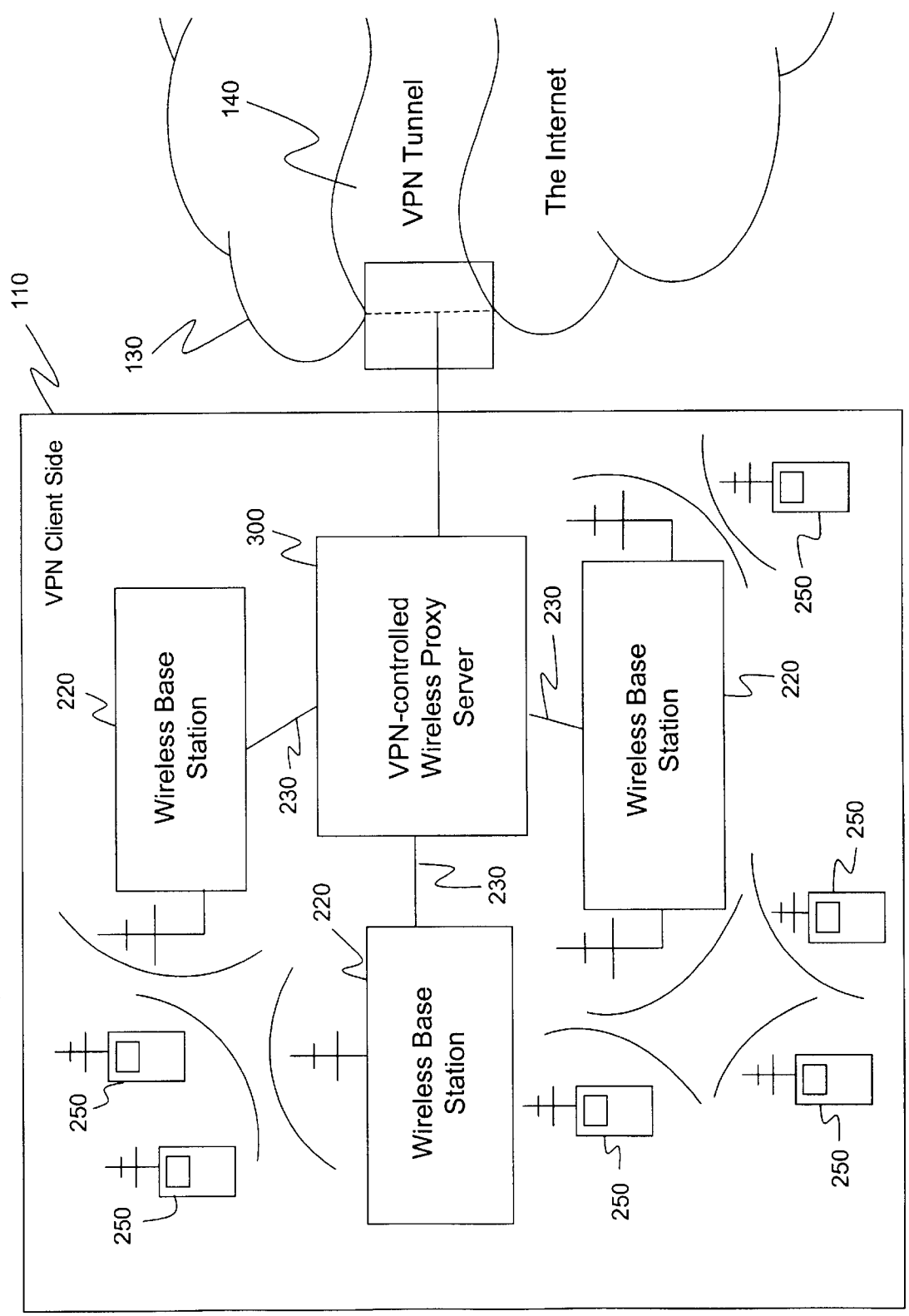
FIG. 3 is a block diagram of a Virtual Private Network (VPN) client side within a secure computer network in accordance with an embodiment of the present invention.

The present invention is used for securing communications within a computer network that includes a plurality of clients connected to an Intranet through a non-secure network such as the Internet. In FIG. 1, the overall structure of a secure computer network is shown schematically. In general, data transferred within the secure computer network is transmitted and received through the Internet 130 (or a VPN Tunnel 140 within the Internet 130) between a client side 120 (or a VPN client side 110) and an Intranet 160. FIG. 2 shows an embodiment of a typical client side 120, and FIG. 3 shows an embodiment of a typical VPN client side 110.

Communications begin at the client side 120 with a client 250, which is a wireless device, such as a PDA, cell phone, or two-way pager in an embodiment of the present invention. At the most basic level, data within the secure computer network is transferred from a client 250 in FIG. 2 to a router 185, mainframe 180, public switch 175, or internal server 170 in FIG. 1. This transfer is accomplished through the use of the plurality of computers that comprise the secure computer network as shown in FIGS. 1, 2, and 3. For the secure computer network to be completely secure, data must be encrypted, and the connection must be protected every time two of the computers within the system transfer data.

Wireless devices present a special challenge. For the computer network of FIG. 1 to be made secure, data must be prevented from being intercepted or captured as it is transferred by radio frequency to and from a wireless device through spaces that may be public. FIG. 2 shows a client side 120, including a plurality of wireless device clients 250, in greater detail. Before broadcast between a client 250 in FIG. 2 and a wireless base station 220 the data is compressed and parsed into packets designed for low bandwidth wireless broadcast. After broadcast, the data is recollected and decompressed before any decryption is performed.

While wireless communications are described herein by way of example as radio frequency communications, it should be understood that the invention is not limited to radio frequency electromagnetic radiation as a mode of wireless communication. Such wireless communication may utilize other frequencies of electromagnetic radiation such as x-ray, ultraviolet, visible, infrared or microwave. Wireless communication might also rely on other forms of transport such as statistical fluctuations in the average density of matter like acoustic or seismic waves. Even dynamically varying chemical potentials or thermal gradients might be harnessed as a mode for wireless communication.

The computer network shown in FIG. 2 is typical of wireless computer networks that allow for a wireless device to connect to an internal server 170 in FIG. 1 through the Internet 130. Wireless base stations are labeled 220 in FIG. 2. A wireless base station might be part of a wireless network architecture such as MOBITEX or MOTIENT that uses digital packet-switching methods such as the Global System for Mobile Communication (GSM), Time Division Multiple Access (TDMA), or Code-Division Multiple Access (CDMA). In another embodiment, the wireless network architecture might be circuit-switched. A wireless base station 220 is connected through a physical cable 230 to a wireless proxy server 210. In transfer between a wireless base station 220 and a wireless proxy server 210 (or between a wireless base station 220 and a middleware server 100 in FIG. 1), data might be encrypted with a second encryption method using both public and private keys (as described below), for example, using a low-layer security protocol such as the Secure Socket Shell (SSH) in addition to other encryption implemented within the system.

The computer network shown in FIG. 2 is used to provide wireless access to a wide geographical region. In an embodiment, there is a plurality of wireless base stations 220 in FIG. 2, each providing wireless access to a different geographical region (also known as a cell). Each wireless base station 220 is connected to a wireless proxy server 210. The wireless proxy server 210 that is connected to the wireless base stations 220 is also connected to the Internet 130, but the wireless proxy server 210 might also be connected to another network, such as a Metropolitan Area Local Area Network (MLAN), Wide Area Local Area Network (WLAN), or other network not in the control of the secure computer network owner. Data transferred from a wireless device client 250 to the Internet 130 through a wireless proxy server 210 is also converted from standard wireless protocols and languages such as WAP, WDP, and WML into protocols and languages that can be used with the Internet such as TCP/IP, FTP, HTTP, and HTML.

The Intranet 160 in FIG. 1 is an embodiment of a computer network that might be implemented within the office headquarters of a company to allow communications between company personnel. Data transferred through the Internet 140 to a middleware server 100 inside the Intranet 160 passes through a firewall 150 implemented within an Intranet 160. The firewall allows Internet 130 access only through predetermined ports. In another embodiment, the firewall 150 restricts the Internet IP addresses that may access the middleware server 100, or the internal server 170 within the Intranet 160 to the IP addresses of the wireless proxy server 210 in FIG. 2. This step limits access to clients 250 connected to the secure computer network through a particular wireless proxy server 210 that is known to be secure.

Alternatively, the firewall might restrict the IP addresses that may access a server within the Intranet 130 to the IP addresses of each client 250 connected to the secure computer network, allowing an even greater degree of control over access to the secure computer network. In yet another embodiment, the secure computer network is further secured through the use of a firewall and a bastion host server in a screened subnet firewall (or "DMZ") configuration, with one firewall 150 between the Internet 130 and the middleware server 100; the middleware server 100 acts as the bastion host server. In the DMZ configuration, the network outside the Intranet 160 sees only the IP address or host name of the middleware server 100, and the network inside the Intranet 160 only sees the IP address or hostname of the firewall 150. All communications are forced through the middleware server 100. As would be recognized by one of ordinary skill in the art, in this embodiment three separate computers must be successfully hacked before the Intranet 160 could be accessed from the Internet 130.

A computer network may be further secured by implementing a virtual private network (VPN). As shown in FIG. 1, a VPN client side 110 can also communicate, through a VPN Tunnel 140 within the Internet 130, with the Intranet 160. FIG. 3 shows a block diagram of a typical VPN client side 110. The VPN is implemented by limiting access to every computer or computer network intervening a wireless base station 220 in FIG. 3 and the Intranet 160 in FIG. 1. The main differences in the structure of a typical client side 120 as shown in FIG. 2 and a VPN client side 110 as shown in FIG. 3 are the VPN-controlled wireless proxy server 300 in FIG. 3 and the VPN Tunnel 140. A wireless base station 220 connects to a VPN-controlled wireless proxy server 300 rather than a standard wireless proxy server (210 in FIG. 2). The VPN-controlled wireless proxy server 300 might then connect to only certain VPN-controlled servers and routers that are part of the Internet 130. The plurality of VPN-controlled Internet servers and routers between a VPN-controlled proxy server 300 and a firewall 150 in FIG. 1 is known as a VPN Tunnel 140, and is shown in FIGS. 1 and 3. The VPN does not allow users outside the secure computer network to have any access to data transferred within the secure computer network; they cannot inspect data within the secure computer network and they cannot find out from whence data is transmitted or received; they cannot see the data at all.

Figure 4:
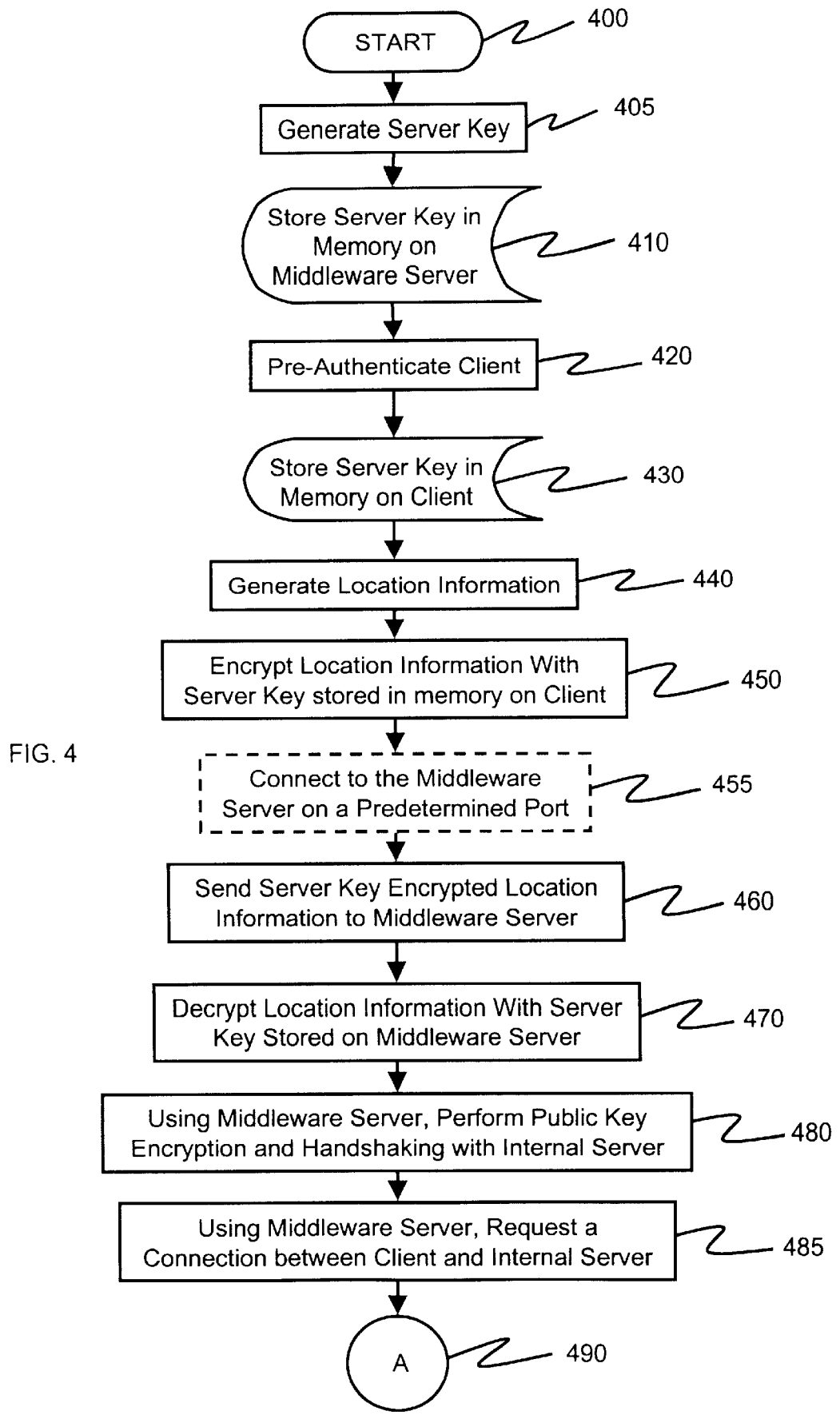
FIG. 4 is a flowchart that illustrates a first part of the control flow of steps performed in securing communications between a wireless device and a middleware server in accordance with an embodiment of the present invention.
Figure 5:
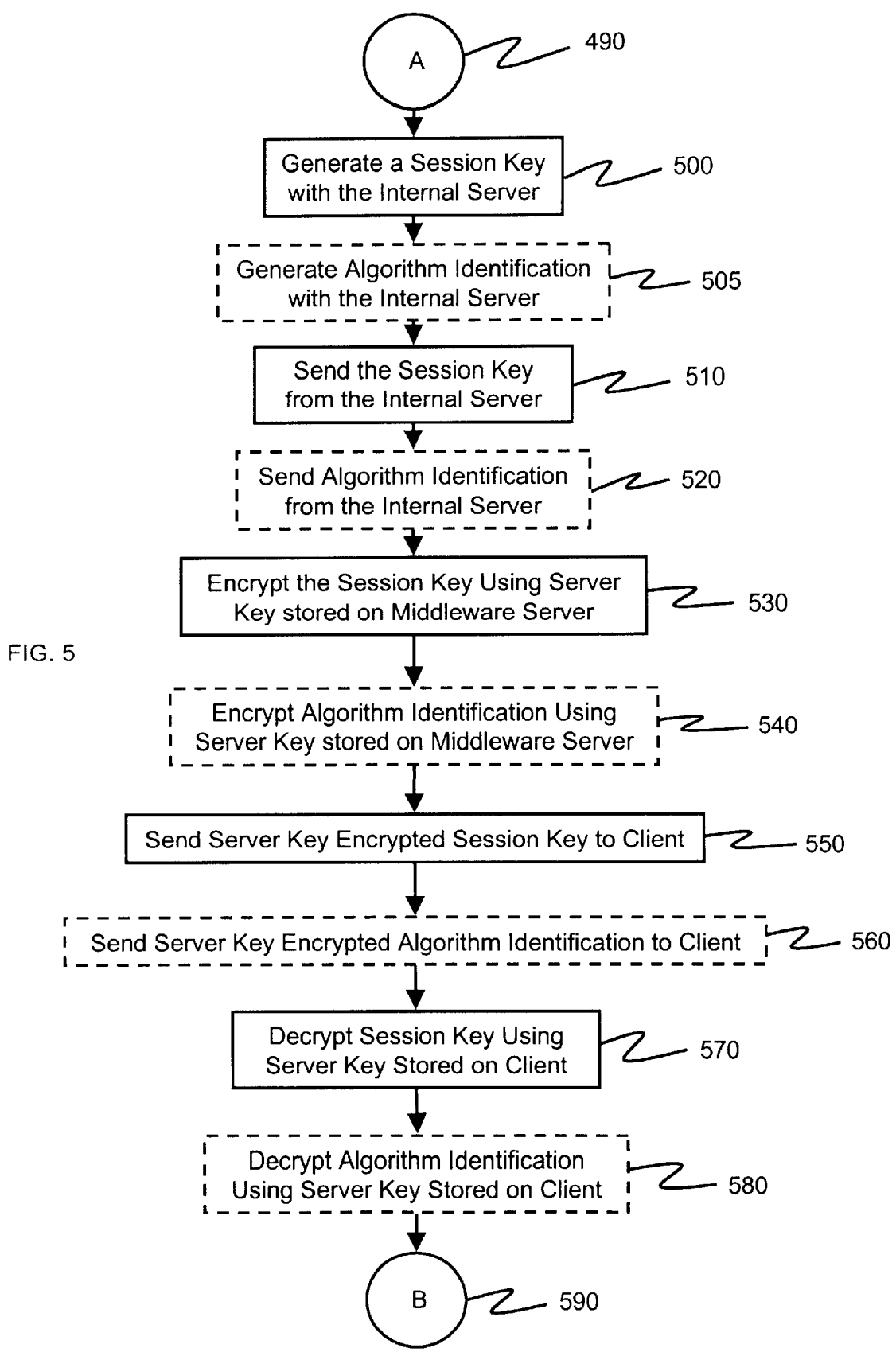
FIG. 5 is a flowchart that illustrates a second part of the control flow of steps performed in securing communications between a wireless device and a middleware server in accordance with an embodiment of the present invention.
Figure 6:
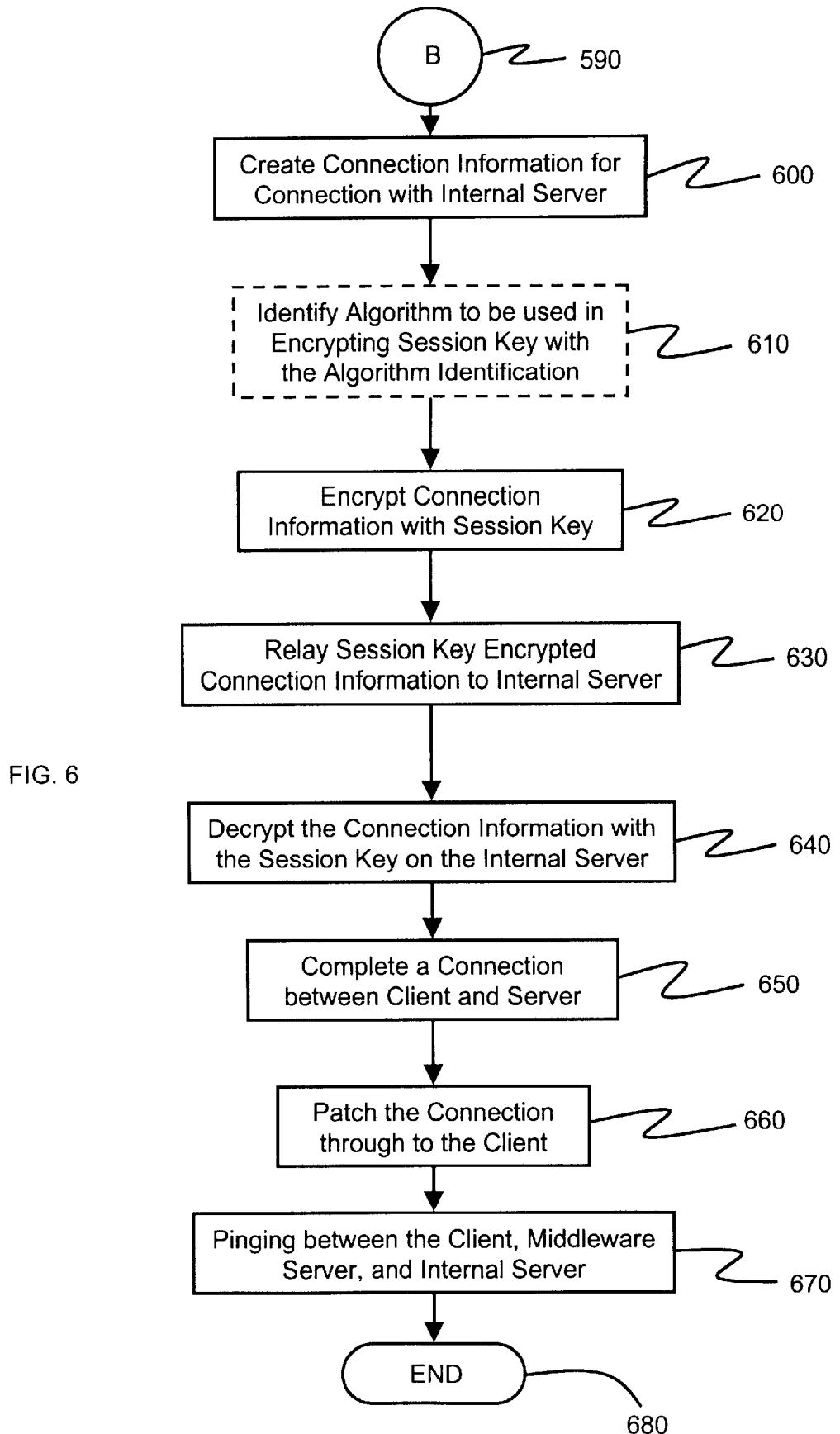
FIG. 6 is a flowchart that illustrates a third part of the control flow of steps performed in securing communications between a wireless device and a middleware server in accordance with an embodiment of the present invention.

A method for using the middleware server 100 to secure a computer network, which may include wireless devices, is shown in FIGS. 4, 5, and 6. The steps shown in FIGS. 4, 5, and 6 are implemented with software loaded onto computers within the secure computer network. Table 1 below show how the principal Java SSH classes are modified in order to complete the method of the present invention. Note that it is not necessary that the present invention be implemented with the Java programming language, or with the SSH protocol. Table 1 is provided as an illustration of one embodiment of the present invention, and one of ordinary skill in the art would know how to implement the method of the present invention on other operating systems, with other protocols, and in other programming languages.

170, it becomes more difficult for the client to gain unauthorized access to the internal server 170 through the network by requesting a connection with that IP address directly (without the connection being passed through the middleware server 100 or firewall 150).

The next set of steps allows secure communication of the location information between the client 250 and the middle-

TABLE 1

Principal Java SSH classes modified in an embodiment of the present invention

| CLASS NAME | COMPUTER | PURPOSE | MODIFICATIONS REQUIRED |
|---|---|---|---|
| Ssb | Server within Intranet | Main class of the application | Removal of references to client side; implementation of method using 3DES server key |
| SshIO | Client | SSH 1.5 implementation | Change to relay data to client using 3DES, rather than displaying locally |
| SshPacket | Server within Intranet AND client | SSH 1.5 packet layer protocol implementation | None |
| SshCrypto | Server within Intranet | Encrypt and decrypt implementation | None |
| Server | Server within Intranet | Listens for a connection from client and spawns new threads, as required | Modify to comply with requirements of operating system |
| SshTerm | Client | Terminal emulation implementation (for connection to server) | Modify to comply with requirements of client operating system |
| Client | Client | Main class with networking, 3DES decryption algorithm, and interface | Modify to comply with requirements of client operating system |

The start 400 of the control flow sequence for the method of secure network communication between a client 250 and an internal server 170 using a middleware server 100 is shown in FIG. 4. In the first step after start 400, the middleware server 100 is used to generate a server key 405. The server key is then stored 410 in memory on the middleware server 100.

Pre-authentication in step 420 of the client 250 by pre-loading of the server key from the middleware server 100 onto the client 250 offers an important advantage of the present method. The server key is generated within the secure Intranet 160, and securely copied from the middleware server 100 to the client 250, using a secure copying means such as a floppy disk, direct cable, or file share within the Intranet 160. This step of the method might be carried out at the beginning of a work day or work week in which the user of the client 250 intends to be away from the secure Intranet 160, but connected to it through a non-secure network such as the Internet 130. After secure copying to the client 250, the client proceeds with the method by storing the server key in memory 430. Subsequent communications between the client 250 and the middleware server 100 are carried out using the server key to encrypt and decrypt the communications.

The client 250 is now equipped to communicate securely with the middleware server 100. Step 440 shows the first step the client 250 takes in establishing a connection with an internal server 170. In step 440, the client 250 is used to generate location information for identifying the location of the internal server 170 within the secure computer network. The location information might be an Internet Protocol (IP) address or host name associated with a particular IP address. The use of such a host name constitutes an additional security feature of the system. When the client knows only the host name rather than the IP address of an internal server ware server 100, where the location information can be used to establish a connection. In step 450 the client 250 continues by encrypting the location information using the server key stored in memory on the client 250 to produce server key encrypted location information. The server key encrypted location information is sent in step 460 from the client to the middleware server.

Step 455 is optional; the connection between the client 250 and the middleware server 100 may be further secured in step 455 by predetermining what port the client 250 will connect with on the middleware server 100. Connection requests for another port on the middleware server 100 might be denied immediately. By picking a port that is not "well-known" (e.g., well-known port 22 for SSH, 80 for HTTP, or 443 for HTTPS), the difficulty of "listening in on" a connection increases. Without knowing the predetermined port, an attacker might have to search through close to 50,000 separate ports before identifying the port being used for communication.

Step 470 is required for recovering the encoded information sent between the client 250 and the middleware server 100. Having received the server key encrypted location information in step 460, the middleware server 100 decrypts in step 470 the server key encrypted location information using the server key stored in memory on the middleware server 100 to produce the (original) location information, which was generated by the client 250 in step 440.

At this point the middleware server 100 is ready to begin facilitating a connection between the client 250 and an internal server 170 within the Intranet 160. The present invention achieves a tremendous advantage in the next step 480, in which the middleware server is used to perform the public key encryption (or "handshaking") necessary for secure communication with the internal server. The processing of public key encryption algorithms is a computing resource intensive operation. Off-loading this processing onto the middleware server 100, which is located within the more secure Intranet 160, makes the present invention faster and more secure than previous methods of securing a computer network that included resource limited clients 250, such as wireless devices.

With the location information for an internal server 170, the middleware server 100 can request in step 485 a connection with the internal server 170 specified by the location information. Upon receipt of such a request, the internal server 170 generates in step 500 (shown in FIG. 5) a session key, and sends the session key to the middleware server 100 in step 510. The circle labeled A in step 490 connects the steps of FIG. 4 to the next set of steps in FIG. 5.

The session key generated in step 500 is generated using a private key encryption algorithm, which may be selected from a set of such algorithms, as described above in the BRIEF SUMMARY OF THE INVENTION. When the private key encryption algorithm is selected from a set of algorithms, it is necessary for the session key sent to be accompanied by algorithm identification, so that an intended user of the session key will know what private key encryption algorithm the session key is meant to be used. Steps 505 and 520 show the optional generating and sending of this algorithm identification along with the session key from the internal server 170 to the middleware server 100.

Before sending the session key (or algorithm identification) outside the Intranet 160, the middleware server 100 needs to secure this information. If an attacker could obtain either, the security of the system would be substantially compromised, although no confidential information would be directly lost. To further secure the computer network, the middleware server 100 proceeds in step 530 (and 540) by encrypting the session key (and the algorithm identification) using the server key stored in memory on the middleware server 100 to produce a server key encrypted session key, which is sent from the middleware server 100 to the client 250. Computers on the Internet 130 that have not been pre-authenticated with the client 250 in step 420 will not be able to access the session key (or algorithm identification), even though the packets containing this information will be transferred through publicly accessible computers on the Internet 130.

The pre-authentication of the client 250 in step 420 allows the client, upon receipt of the server key encrypted session key, to take the step 570 (and 580) of decrypting the server key encrypted session key (and algorithm identification) using the server key stored in memory on the client 250 to produce the (original) session key (and algorithm identification). Having obtained the session key, and optionally the identification of the algorithm to be used with the session key, the client 250 may now communicate securely with the internal server 170 through the Internet 130 without the help of the middleware server 100. The middleware server 100 is now not necessary for communications between the client 250 and the internal server 170 to be kept secure (although the middleware server 100 may still be used for security at a higher level, or for other functions within the secure computer network). The circle labeled B 590 in FIG. 5 connects the steps of FIG. 5 to the next set of steps in FIG. 6.

The client 250 is ready now to establish a secure session with the internal server 170, and in step 600 (shown in FIG. 6) the client 250 generates connection information for a connection between the client and the internal server. Using the session key (and the algorithm identification) in step 620 (and step 610), the client 250 encrypts the connection information in order to produce session key encrypted connection information, and sends the session key encrypted connection information to the middleware server 100.

An embodiment of the connection information and location information is shown in Table 2. The embodiment shown in Table 2 has been implemented for XML based communication format between the client and the server. The information is hard-coded, in this XML based embodiment, to include the character length of the columns and the number of rows (30 and 17, respectively). This is done to comply with the specific requirements set by the operating system running on the client, which might be, for example, Windows CE. By hard-coding these values into the message request for connection, the connection that is established will produce output that will fit onto the screen of the client, which might be a wireless device such as a PDA, cell phone, or two-way pager. In other embodiments of the present invention, the operating system running on the client may do formatting without a need for formatting information to be hard-coded into the connection and location information.

TABLE 2

XML Embodiment of Location and Connection Information

| LOCATION INFORMATION | CONNECTION INFORMATION |
|---|---|
| <?xml version=\"1.0\"?><br><pa<br>  host='cluster.interaccess com'<br>  port='22'<br>  preferredCipher='3des' /> | < xml version=\"1.0\"?><br><pa<br>  username='demo'<br>  password='demonstration'<br>  rows='17' ><br>  columns='30' /> |

Although the middleware server 100 must receive the session key encrypted connection information, it does not decrypt and re-encrypt the connection information, rather it acts only to relay in step 630 the session key encrypted connection information onto the internal server 170. The internal server 170 decrypts in step 640 the session key encrypted connection information using the session key that it generated (in step 500), and may then complete a connection between the client 250 and the internal server 170 with the connection information in step 650. Once the connection has been completed in step 650, the middleware server 100 is used to patch the connection through in step 660 to the client 250 from the internal server 170.

Once the connection has been completed and patched through, the additional step 670 of pinging between the client 250 and middleware server 100, and between the middleware server 100 and the internal server 170 may be performed. The pinging may be done in either direction, e.g., for the middleware server to the client or from the client to the middleware server.

As is known to those of ordinary skill in the art, the description of the steps in the method of the present invention shown in FIGS. 4, 5, and 6 can be carried out readily by implementing the method in software on the clients 250, middleware server 100, and the internal server 170. The method presented is in fact more specific than is necessary for obtaining some of the more important advantages of the present invention. In particular, the middleware server 100 may do the processing of public key encryption for clients 250 using methods other than that presented in the foregoing. For example, additional steps might be necessary to meet the requirements of certain proprietary operating systems in a computer network. Such additional steps should not be construed to be outside the scope of the present invention, since such steps are generally known to those of ordinary skill in the art as necessary for implementing a method in software on a computer network.

Figure 7:
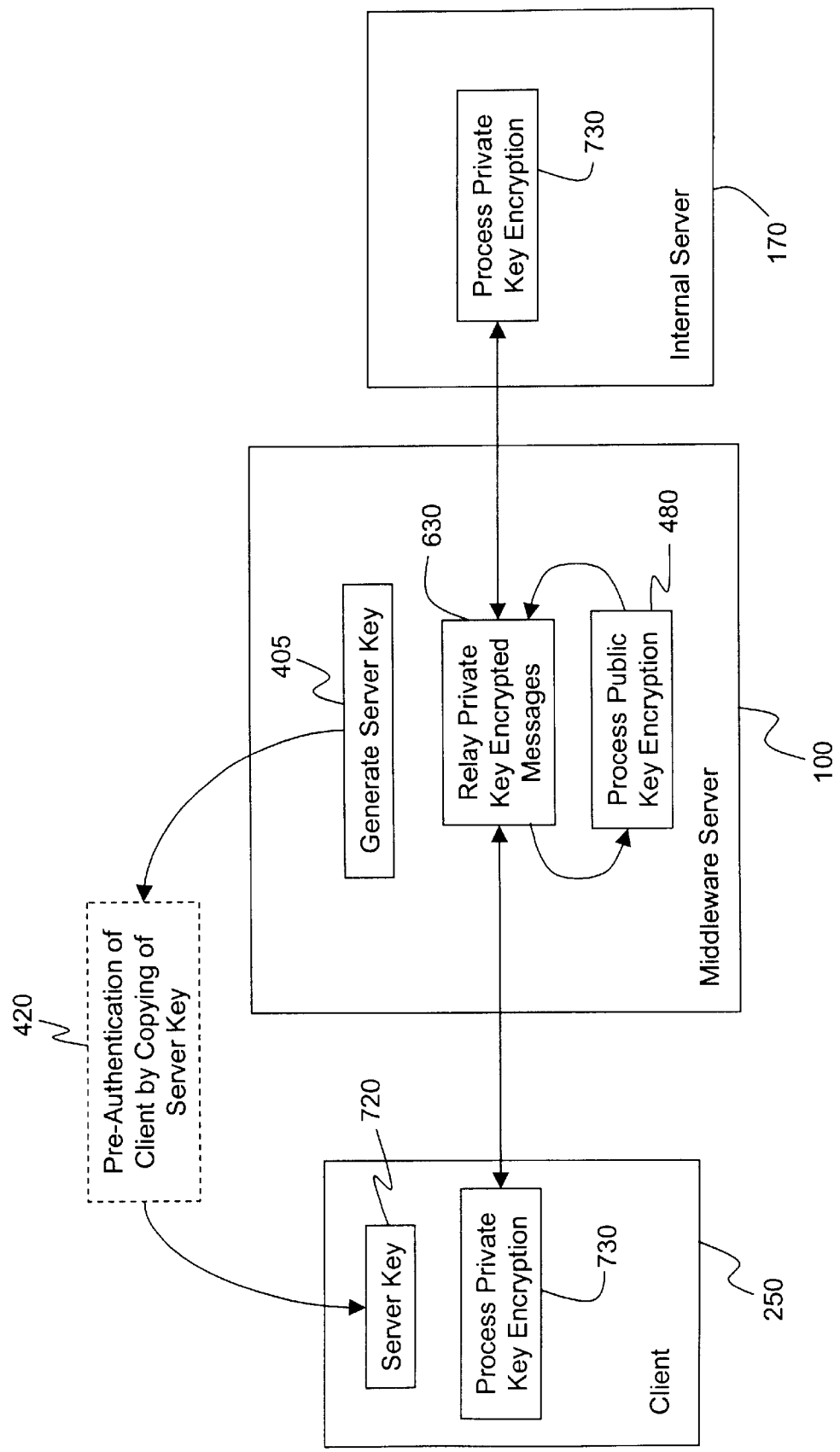
FIG. 7 is a block diagram of how the control flow of steps is performed on the computers within the secure computer network in an embodiment of the present invention.

The combination of structure and function that allows for important advantages of the present invention to be obtained is shown schematically in FIG. 7. The network environment of the client 250, middleware server 100, and internal server 170 are not shown in FIG. 7 because the environment is not necessary to the function of the present invention.

It is important to note at this point that the use of the internal server 170 in the foregoing description of the method of the present invention is not intended to restrict the method to the use of an internal server 170 specifically. The internal server 170 is simply used as an example of a computer within a network, such as that shown in FIG. 1, that is connected to the middleware server 100. The internal server 170 as shown in FIG. 7, and as described in the foregoing, might be any computer within a network, for example, a router 185, mainframe 180, or public switch 175 (as shown in FIG. 1).

The method of the present invention, as presented above, requires the use of a middleware server 100, which allows ill-performing and potentially insecure communications protocols to be off-loaded onto a more powerful machine running in a more secure environment, e.g., within a company's Intranet (160 in FIG. 1). The three most basic steps of the method are: (step 480) using a middleware server 100 for processing public key encrypted messages sent between the client and the internal server; (step 730) using the client and the internal server for processing private key encrypted messages sent between the client and the internal server; and (step 630) using the middleware server, relaying private key encrypted messages sent between the client and the internal server. The basic step 730 includes both encryption and decryption of communications made within the network using a private key, such as the session key, and thus constitutes a combination of several steps of the method shown in FIGS. 4, 5, and 6.

The processing of public key encryption in step 480 might be performed in either direction of communication, i.e., in messages sent from the internal server 170 to the client 250, or from the client 250 to the internal server 170. It is important to note, however, that middleware server 100 is not simply a repository for a public key. In the method of the present invention, the step 480 performed by the middleware server 100 does not require a database or other type of storage device to hold public keys for the client 250 or internal server 170.

Even more importantly, the processing of public key encryption shown as step 480 in FIG. 7 does not require for private key encrypted information, which is encrypted in steps 730 in FIG. 7. There is no need for private key communications to be decrypted and re-encrypted on the middleware server 100. Such decryption and re-encryption on the middleware server 100 would present an opportunity for an attack on the system by gaining control over the middleware server 100. The danger of such an attack is alleviated in the present invention because, according to the method of the present invention, communications between the client 250 and the internal server 170 would not be available for inspection, even if an attacker gained control of the middleware server 100 in the middle of a connection. The present invention thus overcomes the problem of "hijacking" discussed in the BACKGROUND OF THE INVENTION, above.

Although it is not absolutely necessary for keeping the computer network secure, the additional step 420 of pre-authenticating the client with the server key 720 by generating the server key on the middleware server 100 in step 405, and by securely copying the server key 720 from the middleware server 100 to the client 250 in step 420 gains a great advantage in securing the computer network.

In an embodiment of the present invention, the method shown in FIGS. 4–7 is implemented with the Java programming language. But as is known to those of ordinary skill in the art, the middleware server 100 and clients 250 may have software implemented with other programming languages, and the software may be run on any platform or operating system. It is within the scope of the present invention for the method to be implemented even on the hardware level, in an assembly language specific to a device within a computer network that needs to be secured. The method of the present invention might be implemented directly in the hardware of one or more computers within the network.

The encryption method shown in FIGS. 4–7 is performed, in an embodiment, on TCP/IP packets using the 3DES symmetric encryption algorithm. The embodiment of the encryption method shown in FIGS. 4–7 can also be combined with other protocols and encryption methods, for example, by using the middleware server 100 to proxy connections established with the SSH 1.5 or 2.0 protocol.

An important advantage of the present invention is that the algorithm chosen for use in encrypting the communications between a middleware server 100 and a client 250 (as shown in the embodiment of the method of FIGS. 4–7) can be any encryption algorithm. In an embodiment, it is the 3DES symmetric algorithm; in other embodiments, it may use the Blowfish, DESX, or IDEA algorithm. The choice of algorithm can be made with the computing resources of one particular embodiment of the secure computer network in mind, so that the algorithm can be tailored to the specific strengths and weaknesses of the hardware for that embodiment. Similarly, the protocol used for communication between the middleware server 100 and another server outside the Intranet 160 could be any protocol, such as SSL, SFTP, or SSH. Furthermore, the embodiment of the method shown in FIGS. 4–7 will not interfere with other security methods implemented directly on a client 250.

It should be understood that various changes and modifications to the presently preferred embodiments described herein would be apparent to those skilled in the art. Such changes and modifications may be made without departing from the spirit and scope of the present invention and without diminishing its attendant advantages.

What is claimed is:

1. A method for secure network communication between a client and an internal server using a middleware server, the method comprising the steps of:

using the middleware server to generate a server key;

storing the server key in memory on the middleware server;

pre-authenticating the client with the server key by securely copying the server key from the middleware server to the client;

storing the server key in memory on the client;

using the client to generate location information for identifying the location of the internal server;

encrypting the location information using the server key stored in memory on the client to produce server key encrypted location information;

sending the encrypted location information from the client to the middleware server;

decrypting the server key encrypted location information using the server key stored in memory on the middleware server to produce the location information;

using the middleware server to perform public key encryption for communication with the internal server;

using the middleware server to request a connection with the internal server specified by the location information;

using the internal server specified by the location information to generate a session key;

sending the session key from the internal server to the middleware server;

encrypting the session key using the server key stored in memory on the middleware server to produce a server key encrypted session key;

sending the server key encrypted session key from the middleware server to the client;

decrypting the server key encrypted session key using the server key stored in memory on the client to produce the session key;

using the client, creating connection information for a connection between the client and the internal server;

using the session key on the client to encrypt the connection information in order to produce session key encrypted connection information;

using the middleware server, relaying the session key encrypted connection information from the client to the internal server;

decrypting the session key encrypted connection information using the session key on the internal server in order to produce the connection information;

completing a connection between the client and the internal server with the connection information; and using the middleware server, patching the connection through to the client from the internal server.

2. The method of claim 1, further comprising the step of:

connecting the client to the middleware server on a predetermined port.

3. The method of claim 1, further comprising the steps of:

using the internal server specified by the location information to generate an algorithm identification;

sending the algorithm identification from the internal server to the middleware server;

encrypting the algorithm identification using the server key stored in memory on the middleware server to produce server key encrypted algorithm identification;

sending the server key encrypted algorithm identification from the middleware server to the client;

decrypting the server key encrypted algorithm identification using the server key stored in memory on the client to produce the algorithm identification; and identifying the algorithm to be used with the session key using the algorithm identification.

4. The method of claim 1, wherein the step of generating the server key is performed using the Secure Sockets Shell protocols.

5. The method of claim 1, wherein the session key is generated on the internal server using the 3DES encryption algorithm.

6. The method of claim 1, further comprising the step of:

using the middleware server, notifying the client when the connection between the client and the internal server is not completed.

7. The method of claim 3, further comprising the step of:

using the middleware server, notifying the client when the connection between the client and the internal server is not completed.

8. The method of claim 1, further comprising the steps of:

pinging the middleware server with the client; and dropping the connection between the client and the middleware server after a predetermined length of time.

9. The method of claim 1, further comprising the steps of:

pinging the client with the middleware server; and dropping the connection between the client and the middleware server after a predetermined length of time.

10. The method of claim 1, further comprising the step of:

pinging the internal server with the middleware server; and dropping the connection between the internal server and the middleware server after a predetermined length of time.

11. The method of claim 1, further comprising the steps of:

padding a communication made through the connection between the client and the internal server before the communication is sent; and removing the padding for the communication made through the connection between the client and the internal server after the communication has been sent.

* * * * *